United States Patent

[11] 3,611,993

| [72] | Inventor | Douglas J. Norton |
| | | Red Hook, N.Y. |
| [21] | Appl. No. | 875,360 |
| [22] | Filed | Nov. 10, 1969 |
| [45] | Patented | Oct. 12, 1971 |
| [73] | Assignee | The DeLaval Separator Company |
| | | Poughkeepsie, N.Y. |

[54] VALVING ARRANGEMENT FOR OPERATING TEAT CUP LINERS
17 Claims, 4 Drawing Figs.

[52] U.S. Cl. .................................................. 119/14.36, 119/14.37, 119/14.47
[51] Int. Cl. .................................................. A01j 05/04
[50] Field of Search .................................. 119/14.36–14.44, 14.47–14.55, 14.01, 14.02, 14.08

[56] References Cited
UNITED STATES PATENTS

| 807,372 | 12/1905 | Gillies | 119/14.52 |
| 1,393,781 | 10/1921 | Hewlett | 119/14.28 |
| 1,839,765 | 1/1932 | Knox | 119/14.52 |
| 3,255,732 | 6/1966 | Raht | 119/14.52 |
| 3,482,547 | 12/1969 | Maier | 119/14.36 |

*Primary Examiner*—Hugh R. Chamblee
*Attorney*—Davis, Hoxie, Faithfull & Hapgood

ABSTRACT: Below its teat-receiving portion, the liner is provided with an orifice through which air is sucked into the liner when it is collapsed by flow of air into the surrounding pulse space within the shell, so that interruption of the latter flow causes the liner to return to its normal position as the pressures within the liner and the surrounding space tend to equalize due to the orifice; and valve means are provided for closing this orifice when the liner is in its normal position, thereby preventing leakage of milk from the liner into the surrounding pulse space.

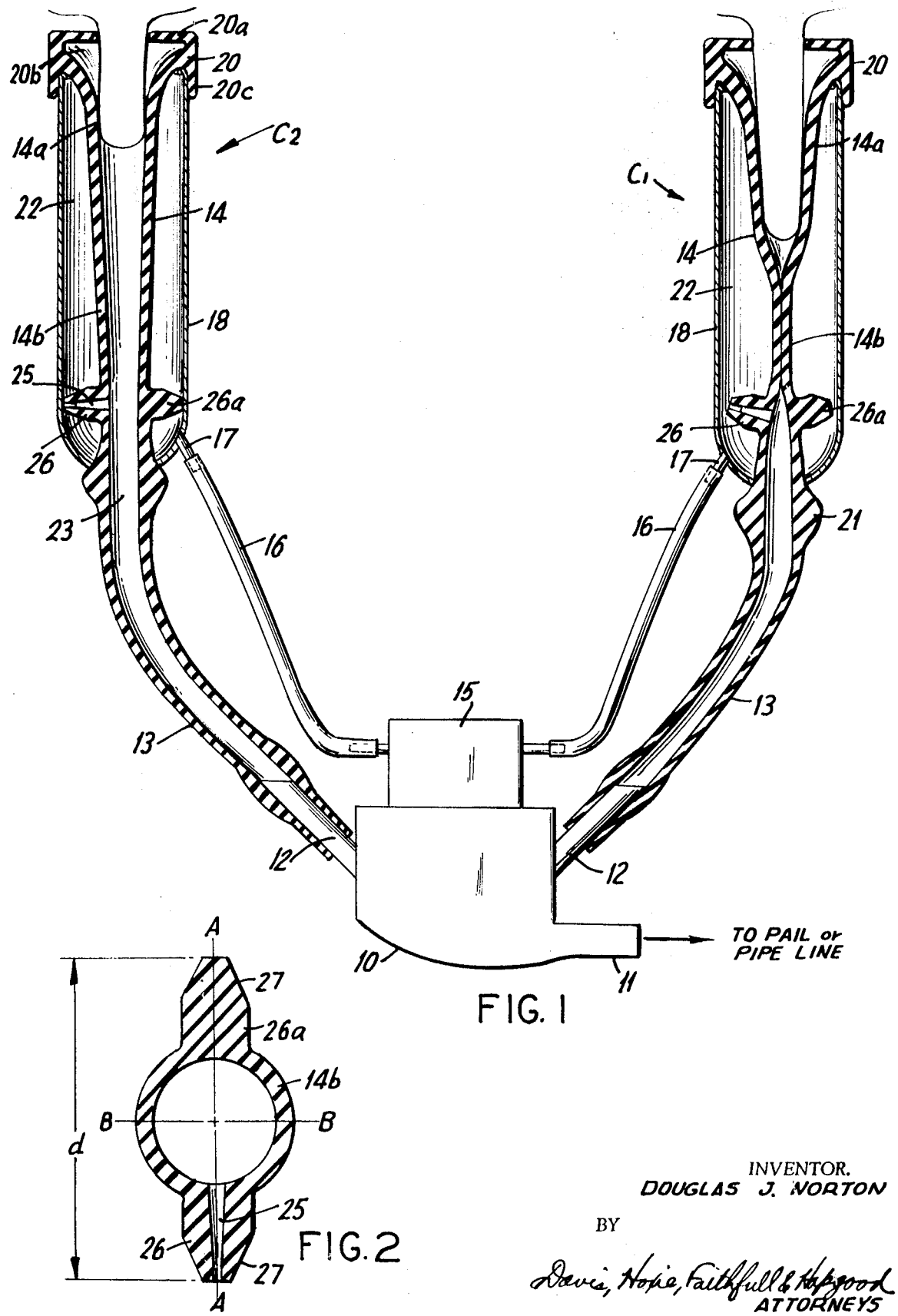

VALVING ARRANGEMENT FOR OPERATING TEAT CUP LINERS

THE DISCLOSURE

This invention relates to milking machines and more particularly to a novel valving arrangement for operating the liners of the teat cups.

Milking machines comprise a cluster of teat cups each having a rigid shell surrounding a flexible liner of rubber or the like, the liner engaging the upper and lower ends of the shell to define therewith a substantially closed annular space used for pneumatically pulsing the liner. The portion of the liner below its teat-receiving portion is provided with a bottom outlet connected to a constant vacuum source through a milk tube (which may be integral with the liner) and a claw common to all teat cups of the cluster, whereby milk is withdrawn from the teats under the influence of the vacuum in the liners.

In order to effect the pulsing of the liners which is essential to the milking operation, conventional milking machines are so arranged that the annular pulse space between the liner and shell of each teat cup is connected alternately to atmosphere and vacuum by an automatic valve serving all of the teat cups of a cluster and which is known as a pulsator. However, the connection to atmosphere causes a collapsing of the liner and thus a sudden interruption of milk flow from the corresponding teat; and as the liner reopens after the subsequent connection to vacuum, the resulting increase in volume can cause a back surge of milk. This adverse reaction can be only partially overcome by introducing an air bleed into the claw piece to which the milk tubes connect a cluster of the teat cups.

Some advantage can be gained by providing a restricted orifice between the interior of each liner and the surrounding pulse space, and by providing means for alternately connecting the pulse space to and isolating it from atmosphere, without subjecting it to vacuum other than through the restricted orifice. For overcoming the above-noted reaction incident to back surge of milk, this expedient is more effective than an air bleed into the claw, and it also simplifies the arrangement for pulsing the liners of the teat cups. However, this expedient has proved to be less than entirely satisfactory for the purpose of an effective and economical milking operation.

An object of the present invention is to provide an arrangement which overcomes the disadvantages of the above-noted expedient while retaining its advantages.

I have discovered that the disadvantages of the above-noted expedient stem from the fact that it permits leakage of milk from the teat through the corresponding liner orifice into the surrounding pulse space in the shell, while the liner is open during the relatively high rate of milk flow from the teat upon return of the liner from its collapsed position.

According to the present invention, valve means are provided for closing the aforesaid orifice in each liner when it is in its normal position during the "milking" phase which produces maximum flow from the teat. Such valve means may take various forms. In a preferred form, the valve means include a protrusion located on the outer wall of the liner below its teat-receiving portion and which comprises at least one element of the valve means. For example, the protrusion may have an outer end through which the liner orifice opens and which seats against the shell when the liner is in its normal position, thereby closing the orifice. Alternatively, the shell may have an internal protrusion for the purpose of closing the orifice in the normal position of the liner; or both the liner and shell may be provided with external and internal protrusions, respectively, for this purpose.

If desired, of course, the liner may be provided with an external protrusion comprising the complete valve means for such closing of the orifice. For example, the protrusion may include a housing containing the movable valve member and seat of a check valve.

In the preferred form of the invention, the lower portion of each liner within its shell is provided with two external protrusions substantially diametrically opposed to each other, and the liner orifice opens through the outer end of one protrusion. These protrusions are so dimensioned that when the airflow to the pulse space in the shell is interrupted and the collapsed liner returns to its normal position, both protrusions engage the shell so that the outer end of the orifice is firmly seated against the shell and thus effectively sealed. Alternatively, both protrusions may have outer ends through which orifices open from the interior of the liner into the surrounding pulse space in the shell, so that each protrusion coacts with the other in assisting the sealing of its orifice.

The cluster of teat cups including the claw is provided with ducts communicating with the respective pulse spaces of the teat cups for supplying pneumatic pulses thereto. Preferably, the pneumatic pulser comprises a separate valve associated with each duct and operable to subject the corresponding pulse space alternately to a relatively high pressure for collapsing the adjacent liner and a relatively low pressure for expanding this liner, and time-controlled means for operating such valves individually in sequence and with each collapsed period of each liner commencing while only the previously collapsed liner is at least partially collapsed and terminating while only the subsequently collapsed liner is at least partially collapsed. In this way, milk flows substantially continuously from the teat cups through the claw, but without flooding of the latter or its vacuum conduit. For a better understanding of the invention, reference may be had to the following detailed description in conjunction with the accompanying drawings, in which:

FIG. 1 is a vertical sectional view, partly in elevation, of two teat cups of a cluster embodying a preferred form of the invention, showing the liners in different operating positions;

FIG. 2 is an enlarged cross-sectional view of one of the liners, taken on a plane through its orifice;

Figure 3:
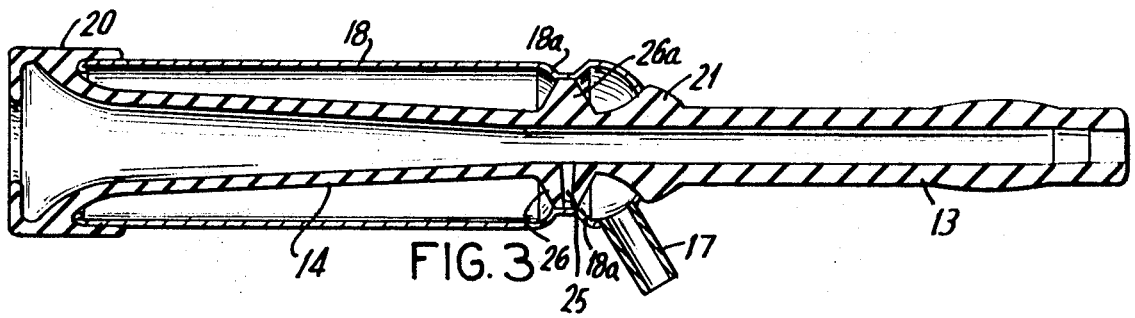
FIG. 3 is a longitudinal sectional view of a modified form of the teat cup liner and shell.

Referring to FIG. 1, a milk claw 10 is provided with the usual outlet nipple 11 for connection through a conduit (not shown) to a constant vacuum source which serves to draw the milk to a pail or pipeline. The claw is also provided with the usual four inlet nipples, of which two are shown at 12. The latter are connected to milk tubes 13 which may be integral with the flexible liners 14 of corresponding teat cups C1 and C2. It will be understood that the other two inlet nipples of claw 10 are similarly connected to the liners of respective teat cups identical to those shown at C1 and C2. The cluster of teat cups is completed by a pulsator 15 mounted on the claw and connected through flexible air ducts 16 to the usual nipples 17 on the rigid shells 18 of the respective teat cups.

Each teat cup liner 14 is made of rubber or the like and includes an upper part 20 and a lower part 21 engaging the corresponding shell 18 at its upper and lower ends, respectively, so as to hold the liner under longitudinal tension in the shell and provide a substantially closed annular pulse space 22 between the liner and shell. As shown, the upper part 20 has an annular flange 20a at the top which defines a central opening for receiving the teat with a close fit, this flange overlying an enlarged cavity 20b through which the teat extends. A flange 20c extends downwardly around the shell 18 from the annular region of part 20 where it seats against the upper end of the shell. The lower part 21 is shown in the form of an annular external bead which seats against the lower end of the shell, whereby the liner and shell can be assembled in the well known manner to place the liner under tension.

As shown in FIG. 1, the part of each liner 14 within the shell comprises an upper portion 14a for closely receiving the teat and a lower portion 14b for passage of the milk from the teat to a bottom outlet 23 below the bead 21 and thence into the milk tube 13. Although the latter is shown as being integral with the beaded part 21 and therefore as part of the liner, it could be made separable therefrom. Accordingly, the liner proper is considered to terminate at the bottom outlet 23.

The lower portion 14b of each liner is provided with an orifice 25 through which its interior is adapted to communicate with the surrounding pulse space 22 in the shell. However, the teat cup includes valve means for closing this orifice when the liner is in its normal open position (the position shown in the teat cup C2 in FIG. 1), and preferably the liner's lower portion 14b has externally protruding means comprising at least one element of such valve means. In the embodiment illustrated in FIG. 1, the protruding means are constituted by a detent 26, the orifice 25 opening through the outer end of this detent. The latter is of such length as to seat its outer end against the inner surface of shell 18 in the normal open position of the liner, thereby closing the orifice 25. To insure a sufficiently firm seating of valve element 26 for closing the orifice completely, the liner in its preferred form has a second external detent 26a of substantially the same length as detent 26 and diametrically opposed thereto; and the distance d (FIG. 2) between the outer ends of the two detents, in the unstressed condition of the liner before it is inserted in the shell, is somewhat greater than the internal diameter of the shell where it engages the detents. In this way, when the liner is in its normal open position in the shell, the detents 26 and 26a cause the corresponding diametrically opposed parts of the liner to be displaced slightly inwardly toward each other, with a resulting reaction which creates a substantial pressure between the shell and the end of each detent.

As shown particularly in FIG. 2, the preferred liner has its orifice 25 tapered toward the outer end of detent 26. This taper insures a nonrestricted air passage and allows for drainage of liquid back into the liner during the milking operation and subsequent washing cycles. Also, the detents are externally tapered toward their outer ends, as shown at 27, thereby providing these ends with very pliable surfaces. Thus, the outer end of detent 26 can readily conform to the shell curvature to effect a good sealing of orifice 25.

In the operation of the teat cups, the interior of each liner 14 is maintained under vacuum due to its connection through claw 10 to a constant vacuum source. When pulsator 15 admits atmospheric air to the pulse space 22, the pressure in this space builds up quickly and collapses the lower portion 14b of the liner by forcing toward each other the diametrically opposed parts thereof which lie in a vertical plane through the detents 26 and 26a, as shown in teat cup C1 in FIG. 1. In other words, as shown in FIG. 2, the collapsing occurs by movement of diametrically opposing parts of the liner portion 14b inwardly or toward each other in the vertical plane A—A and outwardly or away from each other in the vertical plane B—B at right angles to plane A—A. This inward movement is caused to take place along plane A—A because outward movement along that plane is prevented by engagement of detents 26 and 26a with the shell. In the collapsed position of the liner, its opposed parts between the teat and the detents 26-26a are in contact with each other (see liner 14 in teat cup C1), or at least approximately so, since those parts will have moved the greatest distance inwardly. Thus, the collapsing action results in substantially blocking communication between the teat and the corresponding milk discharge tube 13.

It will be apparent that at the outset of the collapsing action of the liner 14, the orifice 25 is opened by disengagement of the protruding valve element (detent 26) from shell 18. This allows air from pulse space 22 to enter the lower portion of the liner so as to drive the milk from tube 13 toward the vacuum source by way of claw 10. However, the collapsing action occurs rapidly despite this airflow through orifice 25, since the latter is so restricted that the flow rate therethrough is far less than the rate at which air enters the pulse space 22 through nipple 17 from the pulsator.

Of course, when the lower portion 14b of the liner is collapsed by the increased pressure in pulse space 22, this pressure increase also acts through the upper portion 14a to squeeze the teat in the usual manner. Such squeezing action and collapse of the liner occur during what is referred to as the rest phase of the milking cycle, in preparation for the subsequent milk phase.

When pulsator 15 cuts off the air supply to pulse space 22, air continues to be drawn from the latter through orifice 25 into the liner's lower portion 14b which is under vacuum. This causes the pressure in pulse space 22 to decrease to essentially the same subatmospheric pressure prevailing within the liner, whereby its lower portion 14b returns to its normal open condition for the milk phase of the cycle, as shown in teat cup C2. During the latter phase, in which milk is drawn from the teat into the milk tube 13, leakage of milk into the pulse space 22 is prevented by the fact that orifice 25 is closed due to engagement of valve element 26 with the inner surface of the shell.

The above-described return of the liner to its normal open condition occurs rapidly despite the restriction of orifice 25. This is so because of the small volume represented by the pulse space 22 and its communication through duct 16 to the pulsator.

It will be understood that when pulsator 15 again admits air to the pulse space 22, the lower portion 14b of the liner is again collapsed to commence a new milking cycle.

In the embodiment shown in FIG. 3, the shell 18 has internally protruding means 18a positioned to engage the outer ends of the liner detents 26 and 26a so as to close orifice 25 when liner 14 is in its normal open condition in the shell. This arrangement enables a reduction in the length of each detent 26-26a. As shown, the protruding means 18a consist of an annular internal protrusion surrounding the liner, whereby the detents are engageable with this protrusion in all possible positions in which the liner is assembled in the shell. In this regard, the FIG. 1 embodiment provides the same effect in that the liner does not require a particular positioning relative to the shell in order that the latter may engage the detents.

Referring to FIG. 3, it is also possible to replace the detents 26-26a entirely by providing the shell 18 internally with protruding means of sufficient length to engage the liner in its normal open condition and thereby seal the orifice 25. In this case, however, the internal protruding means of the shell should not extend continuously around the shell, as at 18a but should be confined to diametrically opposed protrusions so as to accommodate the collapsing action of the liner. Consequently, in assembling the teat cup, it is necessary that the liner be so positioned as to place its orifice 25 opposite one of these protrusions. With the liner so positioned, the valve means for closing the orifice will comprise the outer surface of the liner surrounding the orifice, as one valve element, and the opposing internal protrusion of the shell as the other valve element.

The pulsator 15 may be arranged to operate the four teat cups in any desired manner. For example, the respective liners 14 may be collapsed simultaneously and returned to their open positions simultaneously, or two of them may be collapsed simultaneously with the return of the other two. Preferably, however, the liners are collapsed one-by-one in sequence and with the collapsing of each liner occurring while two other liners are open but just prior to opening of the previously collapsed fourth liner. With this sequence and overlap, a steady flow of milk is obtained from the claw 10 through the milk conduit toward the vacuum source, which prevents flooding and assists in maintaining an even vacuum supply to the milker unit.

Figure 4:
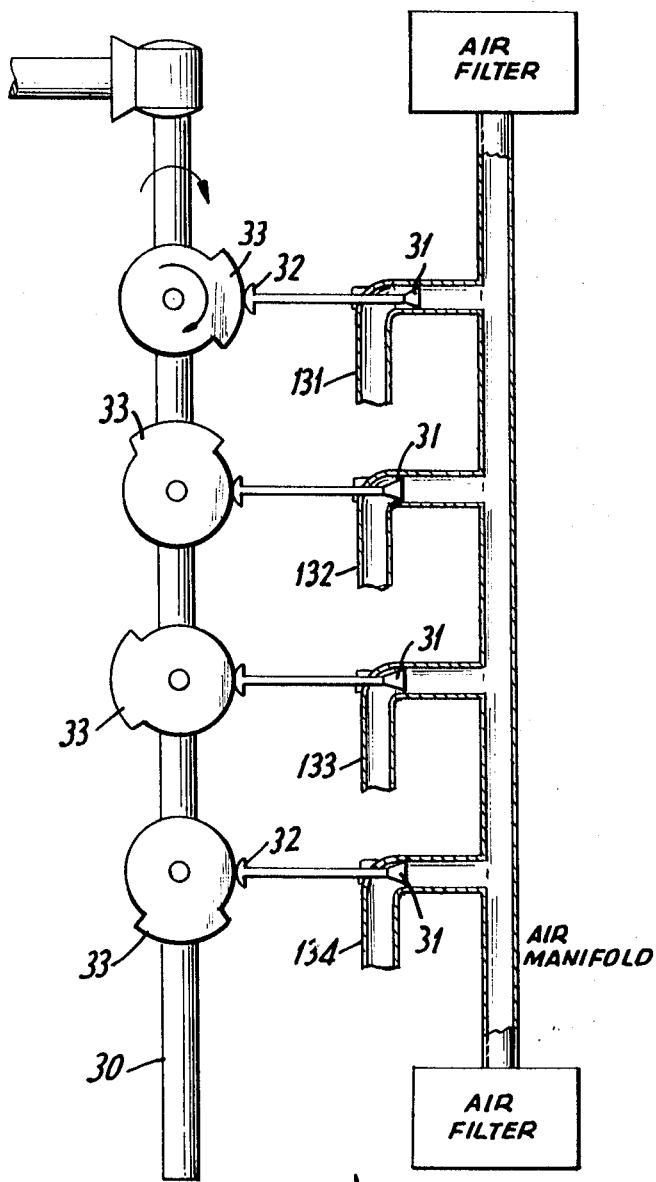
FIG. 4 is a schematic view of a preferred form of the pulser.

As illustrated schematically in FIG. 4, the pulsator 15 comprises a shaft 30 driven at constant speed by an electric motor (not shown). This shaft rotates cams 1, 2, 3 and 4 for operating the respective teat cups C1, C2, C3 and C4. The air supply ducts leading to those teat cups are designated 131, 132, 133 and 134, respectively, and are opened and closed by valves 31 in the respective ducts. These valves are controlled by the corresponding cams through followers 32, and each valve 31 is normally closed but is opened when its follower 32 engages the raised portion 33 of the corresponding cam. As shown in FIG. 4, the raised portions 33 of the cams are so oriented relative to each other as to provide the sequential operation and overlap previously described. Also, the circumferential length of each raised portion 33 is such as to give the desired ratio between the duration of the milk phase and the duration of the rest phase in the operation of the corresponding teat cup. Preferably, this ratio is about 3 to 1, and the shaft 30 is driven at a speed such as to provide 60 pulsations per minute for each teat cup.

I claim:

1. A flexible liner for insertion in the shell of a teat cup, the liner including an upper portion for receiving the teat and including a lower portion having a bottom outlet for passage of milk to a discharge tube, said lower portion also having an orifice for communication between the exterior and the interior of the lower portion, and externally protruding means on said lower portion comprising at least one element of a valve dimensioned for confinement in the shell and operable to close said orifice.

2. A liner according to claim 1, in which the protruding means form a detent having an outer end through which said orifice opens.

3. A liner according to claim 1, in which the protruding means form a detent having an outer end through which said orifice opens, the orifice being tapered toward said outer end.

4. A liner according to claim 1, in which the protruding means form a detent engageable with the shell to close said orifice.

5. A flexible liner for insertion in the shell of a teat cup, the liner comprising upper and lower parts engageable, respectively, with the upper and lower ends of the shell to hold the liner therein, the liner having an upper portion for receiving the teat and having a lower portion forming a bottom outlet for passage of milk to a discharge tube below said lower part, and a pair of substantially diametrically opposed detents on the exterior of said lower portion above said lower part, the liner having an orifice opening through the outer end of one of said detents for communication between the exterior and the interior of the lower portion.

6. A liner according to claim 5, in which the other of said detents is imperforate.

7. A liner according to claim 5, in which said detents are tapered at their outer end portions.

8. A liner according to claim 5, in which the orifice is tapered toward the outer end of said one detent.

9. In combination with a teat cup shell open at its upper and lower ends and provided intermediate said ends with an air-intake passage, a flexible liner engaging said upper and lower ends, respectively, to hold the liner in the shell, the liner and shell defining an annular space into which said passage opens, the liner comprising upper and lower portions surrounded by said annular space and adapted, respectively, to receive a teat and to pass milk therefrom through the lower end of the shell, said lower portion having diametrically opposed parts movable relatively toward each other from normal positions in response to increase of the pressure in said space relative to the internal pressure in said lower portion, said lower portion also having an airflow orifice, and valve means for closing said orifice in response to return of said diametrically opposed parts to their normal positions in the shell.

10. The combination according to claim 9, in which said valve means include an external protrusion on at least one of said diametrically opposed parts.

11. The combination according to claim 10, in which said protrusion has an outer end engaging the shell in said normal positions of the opposed parts, said orifice opening through said outer end.

12. The combination according to claim 9, in which said valve means include an internal protrusion on the shell.

13. The combination according to claim 12, in which said orifice opens through one of said diametrically opposed parts in position to be covered by said internal protrusion in the normal positions of said opposed parts.

14. The combination according to claim 9, in which said valve means include an internal protrusion on the shell extending substantially continuously around said lower portion of the liner, said orifice opening through one of said diametrically opposed parts at a region thereof which engages the protrusion in said normal positions of the parts.

15. The combination of a cluster of teat cups each comprising a shell and a flexible liner extending through the shell to define therewith an annular space, the liner including an upper teat-receiving portion and a lower portion having a bottom outlet for passage of milk through the lower end of the shell, a claw having a milk outlet for connection to a vacuum conduit and also having inlets, milk tubes connecting said bottom outlets of the respective liners to the claw inlets, each of said lower portions having an orifice for flow of air from said annular space to the interior of the lower portion, a duct leading to each of said annular spaces for supplying air thereto at a rate substantially greater than the flow rate allowed by the corresponding orifice, pulsing means for periodically opening and closing the air supply ducts, whereby said lower portion of each liner collapses upon opening of the corresponding air duct and then returns to a normal position when the internal and external pressures on said lower portion are substantially equalized by airflow through the corresponding orifice after closing of the air duct, and means for closing each of said orifices when said lower portion of the corresponding liner is in its said normal position.

16. The combination according to claim 15, in which said pulsing means include a separate valve for each air supply duct, and time-controlled means for opening and closing said valves individually in sequence and with each open period of each valve commencing while only the previously opened valve is open and terminating while only the subsequently opened valve is open, whereby the milk is adapted to flow substantially continuously through said claw and vacuum conduit but without flooding the same.

17. In combination with a cluster of teat cups each including a liner and a shell defining a substantially closed annular space around the liner, a claw having a milk outlet for connection to a vacuum conduit, tubes for conducting milk from the respective liners to the interior of the claw, and ducts communicating with the respective annular spaces for supplying pneumatic pulses thereto, a pneumatic pulser comprising a valve associated with each duct and operable to subject the corresponding annular space alternately to a relatively high pressure for collapsing the adjacent liner and a relatively low pressure for expanding said adjacent liner, and time-controlled means for operating said valve individually in sequence and with each collapsed period of each liner commencing while only the previously collapsed liner is at least partially collapsed and terminating while only the subsequently collapsed liner is at least partially collapsed, whereby the milk is adapted to flow substantially continuously through said claw and vacuum conduit but without flooding the same.